US008024890B2

(12) United States Patent
Bertin et al.

(10) Patent No.: US 8,024,890 B2
(45) Date of Patent: Sep. 27, 2011

(54) COMPRESSED COCONUT COIR PITH GRANULES AND METHODS FOR THE PRODUCTION AND USE THEREOF

(75) Inventors: Marcus Bertin, Dublin, OH (US); Eric Nelson, Dublin, OH (US); Mark Yelanich, Columbus, OH (US)

(73) Assignee: OMS Investments, Inc., Los Angeles, CA (US)

(*) Notice: Subject to any disclaimer, the term of this patent is extended or adjusted under 35 U.S.C. 154(b) by 0 days.

(21) Appl. No.: 12/749,222

(22) Filed: Mar. 29, 2010

(65) Prior Publication Data

US 2010/0180501 A1    Jul. 22, 2010

Related U.S. Application Data

(63) Continuation of application No. 12/260,605, filed on Oct. 29, 2008, now abandoned.

(60) Provisional application No. 61/000,818, filed on Oct. 29, 2007.

(51) Int. Cl.
*A01G 7/00* (2006.01)

(52) U.S. Cl. .......................................................... 47/9

(58) Field of Classification Search ............ 47/58.1 SC
See application file for complete search history.

(56) References Cited

U.S. PATENT DOCUMENTS

| | | | |
|---|---|---|---|
| 507,144 A | 10/1893 | Lundell |
| 605,640 A | 6/1898 | Houghton et al. |
| 940,631 A | 11/1909 | Aylsworth |
| 1,105,047 A | 7/1914 | Thomson |
| 1,827,051 A | 3/1928 | Thomas |
| 1,790,111 A | 1/1931 | Pike |
| 2,450,830 A | 10/1948 | Helberg et al. |
| 2,508,414 A | 5/1950 | Meyer |
| 2,664,404 A | 12/1953 | Blatz et al. |
| 2,917,379 A | 12/1959 | Ryker |
| 2,971,292 A | 2/1961 | Malecki |
| 2,998,550 A | 8/1961 | Collins et al. |
| 3,284,209 A | 11/1966 | Kelley |
| 3,375,607 A | 4/1968 | Melvold |
| 3,396,810 A | 8/1968 | Andrews |
| 3,502,458 A | 3/1970 | Schenk |
| 3,524,279 A | 8/1970 | Adams |
| 3,590,937 A | 7/1971 | Andrews |
| 3,615,809 A | 10/1971 | Nagle et al. |
| 3,653,459 A | 4/1972 | Andrews |
| 3,656,930 A | 4/1972 | Martin |

(Continued)

FOREIGN PATENT DOCUMENTS

CA     1328744     4/1994

(Continued)

OTHER PUBLICATIONS

International Search Report for International Application No. PCT/US07/76852 mailed Sep. 9, 2008.

(Continued)

*Primary Examiner* — Francis T Palo
(74) *Attorney, Agent, or Firm* — Hunton & Williams LLP

(57) ABSTRACT

Compressed coconut coir pith granules having unique physical and horticultural characteristics are provided along with methods for producing such compressed products by subjecting coconut coir pith to compaction utilizing a roll compactor and subsequently granulating the compacted material.

40 Claims, 1 Drawing Sheet

U.S. PATENT DOCUMENTS

| | | |
|---|---|---|
| 3,669,204 A | 6/1972 | Andrews |
| 3,703,464 A | 11/1972 | Ferm |
| 3,809,175 A | 5/1974 | Andrews |
| 3,842,537 A | 10/1974 | Bishop |
| 3,960,722 A | 6/1976 | Tomikawa et al. |
| 3,973,355 A | 8/1976 | McKenzie |
| 4,063,919 A | 12/1977 | Grano, Jr. |
| 4,072,794 A | 2/1978 | Tomita et al. |
| 4,098,398 A | 7/1978 | Myers |
| 4,123,518 A | 10/1978 | Behrenz et al. |
| 4,172,039 A | 10/1979 | Akiyama |
| 4,174,957 A | 11/1979 | Webb et al. |
| 4,185,987 A | 1/1980 | Tilkanen |
| 4,258,659 A | 3/1981 | Rowell |
| 4,277,345 A | 7/1981 | Heitkamp et al. |
| 4,318,248 A | 3/1982 | Muldner |
| 4,341,180 A | 7/1982 | Cortigene et al. |
| 4,473,390 A | 9/1984 | Teufel |
| 4,537,877 A | 8/1985 | Ericsson |
| 4,551,165 A | 11/1985 | Warner |
| 4,570,573 A | 2/1986 | Lohman |
| 4,570,578 A | 2/1986 | Peschka et al. |
| 4,579,578 A | 4/1986 | Cooke |
| 4,591,635 A | 5/1986 | Greve et al. |
| 4,627,382 A | 12/1986 | Muzzey |
| 4,643,811 A | 2/1987 | Langlois |
| 4,643,814 A | 2/1987 | Goldstein |
| 4,675,388 A | 6/1987 | Greve |
| 4,705,248 A | 11/1987 | McIntyre |
| 4,721,059 A | 1/1988 | Lowe et al. |
| 4,723,510 A | 2/1988 | Skillestad |
| 4,734,393 A | 3/1988 | Lowe et al. |
| 4,738,286 A | 4/1988 | McIntyre |
| 4,762,155 A | 8/1988 | Gruber |
| 4,786,308 A | 11/1988 | Colling |
| 4,875,537 A | 10/1989 | Garnatz et al. |
| 4,895,250 A | 1/1990 | Schifrin |
| 4,921,831 A | 5/1990 | Nakai et al. |
| 4,925,343 A | 5/1990 | Raible et al. |
| 5,037,690 A | 8/1991 | Van der Kooy |
| 5,060,598 A | 10/1991 | Richards |
| 5,074,379 A | 12/1991 | Batrice |
| 5,092,457 A | 3/1992 | Islava et al. |
| 5,106,648 A | 4/1992 | Williams |
| 5,180,033 A | 1/1993 | Wilson |
| 5,195,465 A | 3/1993 | Webb et al. |
| 5,215,407 A | 6/1993 | Brelsford |
| 5,218,783 A | 6/1993 | Langezaal et al. |
| 5,300,127 A | 4/1994 | Williams |
| 5,307,577 A | 5/1994 | Werling |
| 5,337,416 A | 8/1994 | Ryan et al. |
| 5,337,496 A | 8/1994 | Glorioso |
| 5,338,131 A | 8/1994 | Bestmann |
| 5,340,642 A | 8/1994 | Baumgartl et al. |
| 5,404,209 A | 4/1995 | Matsuoka et al. |
| 5,419,945 A | 5/1995 | Lopez |
| 5,422,330 A | 6/1995 | Kaylor |
| 5,424,404 A | 6/1995 | Ruske et al. |
| 5,425,597 A | 6/1995 | Bestmann |
| 5,458,662 A | 10/1995 | Teyone |
| 5,496,378 A | 3/1996 | Hengelsberg et al. |
| 5,516,486 A | 5/1996 | Wright |
| 5,587,277 A | 12/1996 | Yamashita et al. |
| 5,630,377 A | 5/1997 | Kumlin |
| 5,658,571 A | 8/1997 | Gopalan et al. |
| 5,678,954 A | 10/1997 | Bestmann |
| 5,710,190 A | 1/1998 | Jane et al. |
| 5,716,840 A | 2/1998 | Kahler et al. |
| 5,727,499 A | 3/1998 | Armington et al. |
| 5,728,790 A | 3/1998 | Seki et al. |
| 5,747,549 A | 5/1998 | Tsurugai et al. |
| 5,750,661 A | 5/1998 | Schloesser et al. |
| 5,750,742 A | 5/1998 | Schroder et al. |
| 5,772,721 A | 6/1998 | Kazemzadeh |
| 5,839,674 A | 11/1998 | Ellis |
| 5,840,632 A | 11/1998 | Miller |
| 5,843,203 A | 12/1998 | Lindsay et al. |
| 5,860,391 A | 1/1999 | Maxwell |
| 5,883,025 A | 3/1999 | Karstens |
| 5,922,189 A | 7/1999 | Santos |
| 5,927,049 A | 7/1999 | Simard |
| 5,942,457 A | 8/1999 | Santos |
| 5,976,210 A | 11/1999 | Sensibaugh |
| 6,019,063 A | 2/2000 | Haubensak et al. |
| 6,027,652 A | 2/2000 | Hondroulis et al. |
| 6,032,409 A | 3/2000 | Obonai |
| 6,036,971 A | 3/2000 | Kimoto et al. |
| 6,041,546 A | 3/2000 | Baranova |
| 6,048,968 A | 4/2000 | Etzbach et al. |
| 6,053,125 A | 4/2000 | Kory et al. |
| 6,071,487 A | 6/2000 | Campion et al. |
| 6,076,299 A | 6/2000 | Spittle et al. |
| 6,083,621 A | 7/2000 | Sugimoto |
| 6,085,806 A | 7/2000 | Davis et al. |
| 6,107,242 A | 8/2000 | Ackerman et al. |
| 6,189,260 B1 | 2/2001 | Kusey et al. |
| 6,197,081 B1 | 3/2001 | Schmidt |
| 6,218,321 B1 | 4/2001 | Lorcks et al. |
| 6,219,968 B1 | 4/2001 | Belger et al. |
| 6,271,190 B1 | 8/2001 | Boskamp et al. |
| 6,286,626 B1 | 9/2001 | Evans |
| 6,322,734 B1 | 11/2001 | Zanten et al. |
| 6,357,176 B2 | 3/2002 | Baldwin et al. |
| 6,360,478 B1 | 3/2002 | Spittle |
| 6,391,120 B1 | 5/2002 | Silva |
| 6,395,166 B1 | 5/2002 | Haydock |
| 6,403,134 B1 | 6/2002 | Nayyar et al. |
| 6,408,568 B1 | 6/2002 | Kusey et al. |
| 6,444,467 B1 | 9/2002 | Fan et al. |
| 6,455,149 B1 | 9/2002 | Hagen et al. |
| 6,472,588 B1 | 10/2002 | Haigler et al. |
| 6,479,433 B1 | 11/2002 | Hann et al. |
| 6,491,840 B1 | 12/2002 | Frankenbach et al. |
| 6,495,058 B1 | 12/2002 | Frankenbach et al. |
| 6,508,306 B1 | 1/2003 | Reddy et al. |
| 6,517,600 B1 | 2/2003 | Dinel |
| 6,539,882 B2 | 4/2003 | Layt et al. |
| 6,547,493 B2 | 4/2003 | Spangler et al. |
| 6,596,324 B1 | 7/2003 | Homan |
| 6,609,331 B1 | 8/2003 | Stamp |
| 6,620,507 B2 | 9/2003 | Kadowaki et al. |
| 6,645,392 B2 | 11/2003 | Frankenbach et al. |
| 6,652,766 B1 | 11/2003 | Frankenbach et al. |
| 6,689,609 B1 | 2/2004 | Fan et al. |
| 6,695,544 B2 | 2/2004 | Knudson et al. |
| 6,696,284 B2 | 2/2004 | Haridas et al. |
| 6,709,202 B2 | 3/2004 | Spangler et al. |
| 6,711,850 B2 | 3/2004 | Yelanich et al. |
| 6,732,666 B2 | 5/2004 | Layt |
| 6,773,594 B1 | 8/2004 | Van der Wijngaart |
| 6,790,819 B2 | 9/2004 | Trinh et al. |
| 6,851,221 B2 | 2/2005 | Layt et al. |
| 6,861,131 B2 | 3/2005 | Evans |
| 6,863,027 B1 | 3/2005 | Silva |
| 6,863,816 B2 | 3/2005 | Austin et al. |
| 6,881,338 B2 | 4/2005 | Austin et al. |
| 6,893,193 B2 | 5/2005 | Santha |
| 6,896,805 B2 | 5/2005 | Austin |
| 6,903,197 B2 | 6/2005 | Tresch et al. |
| 6,910,835 B2 | 6/2005 | Spangler et al. |
| 6,913,423 B2 | 7/2005 | Spangler et al. |
| 6,933,371 B2 | 8/2005 | Schroder et al. |
| 6,946,295 B2 | 9/2005 | Polonenko et al. |
| 7,005,410 B2 | 2/2006 | Trinh et al. |
| 7,141,659 B2 | 2/2006 | Lynch et al. |
| 7,012,053 B1 | 3/2006 | Barnabas et al. |
| 7,029,586 B2 | 4/2006 | Austin et al. |
| 7,036,272 B2 | 5/2006 | Stoever |
| 7,087,169 B2 | 8/2006 | Austin |
| 7,091,400 B2 | 8/2006 | Haigler et al. |
| 7,098,324 B2 | 8/2006 | Haigler et al. |
| 7,109,015 B2 | 9/2006 | Liao |
| 7,117,634 B2 | 10/2006 | Pelton |
| 7,119,166 B2 | 10/2006 | Lin |
| 7,165,358 B2 | 1/2007 | Wright |
| 7,485,171 B2 | 2/2009 | Lynch et al. |
| 7,587,856 B2 * | 9/2009 | Rubin et al. ............... 47/1.01 R |

| | | |
|---|---|---|
| 7,607,258 B2 | 10/2009 | Holmenlund |
| 2001/0013198 A1* | 8/2001 | Krysiak et al. ............... 47/58.1 |
| 2001/0053545 A1 | 12/2001 | Engwar |
| 2002/0007592 A1 | 1/2002 | Mischo |
| 2002/0011024 A1 | 1/2002 | Baldwin et al. |
| 2002/0062770 A1 | 5/2002 | Layt |
| 2002/0073616 A1 | 6/2002 | Pelton |
| 2002/0112293 A1 | 8/2002 | Trinh et al. |
| 2002/0129545 A1 | 9/2002 | Morris |
| 2002/0131826 A1 | 9/2002 | Spangler |
| 2002/0131827 A1 | 9/2002 | Spangler |
| 2002/0194649 A1 | 12/2002 | Fan et al. |
| 2003/0031511 A1 | 2/2003 | Tyler |
| 2003/0061639 A1 | 3/2003 | Polonenko et al. |
| 2003/0070191 A1 | 4/2003 | Haigler et al. |
| 2003/0086764 A1 | 5/2003 | Knudson et al. |
| 2003/0089152 A1 | 5/2003 | Yelanich et al. |
| 2003/0106097 A1 | 6/2003 | Haigler et al. |
| 2003/0140553 A1 | 7/2003 | Moore |
| 2003/0146164 A1 | 8/2003 | Robson |
| 2003/0146405 A1 | 8/2003 | Frankenbach et al. |
| 2003/0157668 A1 | 8/2003 | Polonenko et al. |
| 2003/0172699 A1 | 9/2003 | Phinney |
| 2003/0183140 A1 | 10/2003 | Layt |
| 2003/0209686 A1 | 11/2003 | Frankenbach et al. |
| 2003/0230529 A1 | 12/2003 | Austin et al. |
| 2004/0000517 A1 | 1/2004 | Austin et al. |
| 2004/0005198 A1 | 1/2004 | Spangler et al. |
| 2004/0025422 A1 | 2/2004 | Macquoid et al. |
| 2004/0040209 A1 | 3/2004 | Layt et al. |
| 2004/0049808 A1 | 3/2004 | Haigler et al. |
| 2004/0049980 A1 | 3/2004 | Principe |
| 2004/0065005 A1 | 4/2004 | Morris |
| 2004/0098270 A1 | 5/2004 | Obayashi et al. |
| 2004/0111967 A1 | 6/2004 | Raap et al. |
| 2004/0141816 A1 | 7/2004 | Spangler et al. |
| 2004/0156687 A1 | 8/2004 | Knudson et al. |
| 2004/0209991 A1 | 10/2004 | Piret et al. |
| 2004/0211721 A1 | 10/2004 | Stamets |
| 2004/0216374 A1 | 11/2004 | Davids |
| 2004/0221397 A1 | 11/2004 | Trinh et al. |
| 2004/0228692 A1 | 11/2004 | McCamy |
| 2004/0237387 A1 | 12/2004 | McCamy |
| 2004/0237388 A1 | 12/2004 | Moore |
| 2005/0034367 A1 | 2/2005 | Morrow |
| 2005/0060811 A1 | 3/2005 | Smith et al. |
| 2005/0061045 A1 | 3/2005 | Lynch et al. |
| 2005/0076564 A1 | 4/2005 | Castleberry |
| 2005/0082222 A1 | 4/2005 | Austin |
| 2005/0098759 A1 | 5/2005 | Frankenbach et al. |
| 2005/0102895 A1 | 5/2005 | Bissonnette et al. |
| 2005/0124065 A1 | 6/2005 | Fan |
| 2005/0141966 A1 | 6/2005 | Greene |
| 2005/0161407 A1 | 7/2005 | McPhillips |
| 2005/0176583 A1 | 8/2005 | Stamets |
| 2005/0183331 A1 | 8/2005 | Kania |
| 2005/0204620 A1 | 9/2005 | Butterfield et al. |
| 2005/0218071 A1 | 10/2005 | Austin et al. |
| 2005/0235558 A1 | 10/2005 | Carrillo |
| 2005/0236315 A1 | 10/2005 | McPhillips |
| 2005/0241231 A1 | 11/2005 | Bissonnette et al. |
| 2005/0246954 A1 | 11/2005 | Bissonnette et al. |
| 2005/0246955 A1 | 11/2005 | Bissonnette et al. |
| 2005/0254899 A1 | 11/2005 | Tyler |
| 2005/0257424 A1 | 11/2005 | Bissonnette et al. |
| 2005/0269260 A1 | 12/2005 | Austin |
| 2005/0274074 A1 | 12/2005 | Stamp |
| 2006/0032804 A1 | 2/2006 | McPhillips |
| 2006/0070294 A1 | 4/2006 | Spittle |
| 2006/0088935 A1 | 4/2006 | Fan et al. |
| 2006/0101881 A1 | 5/2006 | Carin et al. |
| 2006/0107589 A1 | 5/2006 | Rubin |
| 2006/0112629 A1 | 6/2006 | Wright |
| 2006/0160907 A1 | 7/2006 | Stamp |
| 2006/0168881 A1 | 8/2006 | Straumietis |
| 2006/0174379 A1 | 8/2006 | Haigler et al. |
| 2006/0179711 A1 | 8/2006 | Bissonnette et al. |
| 2006/0185235 A1 | 8/2006 | Bono |
| 2006/0207170 A1 | 9/2006 | Smith |
| 2006/0237363 A1 | 10/2006 | Austin et al. |
| 2006/0248796 A1 | 11/2006 | Hashimoto et al. |
| 2007/0022661 A1 | 2/2007 | Slater |
| 2007/0094928 A1 | 5/2007 | Hunter |
| 2007/0209277 A1 | 9/2007 | Schuck et al. |
| 2008/0039605 A1 | 2/2008 | Qiu |
| 2008/0155897 A1 | 7/2008 | Van de Wetering |
| 2008/0202024 A1 | 8/2008 | Spittle et al. |
| 2008/0216404 A1 | 9/2008 | Jarvis |
| 2008/0236037 A1 | 10/2008 | Rose |
| 2008/0280760 A1 | 11/2008 | Oliver |
| 2008/0287295 A1 | 11/2008 | Rubin |
| 2009/0019765 A1 | 1/2009 | Kosinski |
| 2009/0113791 A1* | 5/2009 | Bertin et al. ..................... 47/9 |
| 2009/0139927 A1 | 6/2009 | Kania et al. |
| 2009/0200241 A1 | 8/2009 | Harman et al. |
| 2009/0253576 A1 | 10/2009 | Ikin |

FOREIGN PATENT DOCUMENTS

| | | |
|---|---|---|
| DE | 1145193 | 3/1963 |
| DE | 10063017 | 7/2002 |
| DE | 102004038299 | 3/2006 |
| EP | 0487655 | 6/1992 |
| EP | 512272 | 11/1992 |
| EP | 0640280 | 3/1995 |
| EP | 736494 | 10/1996 |
| EP | 0786496 | 7/1997 |
| EP | 849243 | 6/1998 |
| EP | 0867112 | 9/1998 |
| EP | 849243 A3 | 12/1998 |
| EP | 0962129 | 3/2003 |
| EP | 1625785 | 2/2006 |
| GB | 393783 | 6/1933 |
| GB | 1491940 | 11/1977 |
| GB | 2137609 | 11/1984 |
| GB | 2272903 | 6/1994 |
| GB | 2308538 | 7/1997 |
| GB | 2332353 | 6/1999 |
| JP | 10042689 | 2/1998 |
| JP | 11056017 | 3/1999 |
| JP | 2002238347 | 8/2002 |
| KR | 960013590 B | 10/1996 |
| KR | 20020002030 | 1/2002 |
| KR | 20020068556 | 8/2002 |
| KR | 20020085189 | 11/2002 |
| KR | 20020092752 | 12/2002 |
| KR | 20030052374 | 6/2003 |
| KR | 20030052375 | 6/2003 |
| KR | 20040062497 | 7/2004 |
| KR | 20040067336 | 7/2004 |
| MX | PA02004768 | 12/2004 |
| NL | 94/01955 | 7/1996 |
| WO | WO 91/03149 | 3/1991 |
| WO | WO 94/12576 | 6/1994 |
| WO | WO 9412576 | 6/1994 |
| WO | WO 96/12687 | 5/1996 |
| WO | WO 99/07943 | 2/1999 |
| WO | WO 01/13706 | 3/2001 |
| WO | WO 01/57156 | 8/2001 |
| WO | WO 02/02889 | 1/2002 |
| WO | WO 03/037069 | 5/2003 |
| WO | WO 2004/037748 | 5/2004 |
| WO | WO 2004/078892 | 9/2004 |
| WO | WO 2004/098270 | 11/2004 |
| WO | WO 2005/070852 | 8/2005 |
| WO | WO 2005/095337 | 10/2005 |
| WO | WO 2006/025657 | 3/2006 |
| WO | WO 2007/009249 | 1/2007 |
| WO | WO 2008/025027 | 2/2008 |
| WO | WO 2008/048778 | 4/2008 |
| WO | WO 2008/114953 | 9/2008 |
| WO | WO 2009/009805 | 1/2009 |

OTHER PUBLICATIONS

Meerow, "Coir Dust, A Viable Alternative to Peat Moss," 7 pages (1997).

Meerow, "Coir Dust (Enviro-Coir), A Viable Alternative to Peat Moss," 3 pages (2007).

EcoGro: "Nature has Designed the Finest Growing Media for your Plants" (1998).

Martinez, "Coir could quickly gain share in Growing Media Market," Greenhouse Management & Production, Jul. 1995.

Meerow, TropicLine Trade Publication, The Potential of Coir(Coconut Mescarp Pith) as a Peal Substitute in container Media, Tropical Horticulture Newsletter of Ft. Lauderdale Research and Education Center, vol. 6, No. 2 (1993).

Meerow, TropicLine Trade Publication, Coir (Coconut Mesocarp Pith) as a Peat Substitute, Tropical Horticulture Newsletter of Ft. Lauderdale Research and Education Center vol. 7, No. 3 (1994).

The Scotts Company LLC's Invalidity Contentions Pursuant to Patent Rule 3-3 in the United States District Court for the District of Nevada, Case No.: 09-CV-02419 (GMN) RJJ, dated Dec. 13, 2010.

Scoggins, "Development of the Press Extraction Method for Plug Substrate Analysis" (1999).

Stamps et al., "Growth of Dracaena Marginata and Spathiphyllum 'Petite' in Sphagnum Peat-and Coconut Coir Dust-based Growing Media," Journal of Environmental Horticulture, vol. 17, pp. 49-52 (1999).

Viswanathan et al., "Pressure Density Relationships and Stress Relaxation Characteristics of Coir Pith," Journal of Agricultural Engineering Research, 73(3) 217 (1999).

Nichols, "Coir—a XXIst century sustainable growing medium," Proceedings of the VIIIth International Symposium on Protected Cultivation in Mild Winter Climates etc . . . , vol. 747 (2006).

Meerow, "Growth of Two Subtropical Ornamentals Using Coir (coconut mesocarp pith) as a peat substitute," HortScience, vol. 29, No. 12 (1994).

Meerow, "Growth of Two tropical foliage plants using coir dust as a container medium amendment," HortTechnologyvol. 5, No. 3 (1995).

Unknown, Greenhouse Product News: Counting on Coir, retrieved from the Internet at: http://www.gpnmag.com/Counting-on-Coir-article4388 in Dec. 2009.

Unknown, GreeNeem Web Page, retrieved from http://www.greeneem.com/about.htm in Apr. 2007.

Unknown, GreeNeem Web Page retrieved from http://www.greeneem.com/neemcake.htm in Apr. 2007.

Unknown, GreeNeem Web Page retrieved from http://www.greeneem.com/cococoirpeat.htm in Apr. 2007.

Lanka Santha et al., "Facts on Coir: Lessons from the Past," Feb. 1999 http://www.rolanka.com/index.asp?pg=coirarticle.

Meerow, Coir Coconut Mesocarp Pith (Enviro-Coir) as a Peat Substitute (2007).

* cited by examiner

COMPRESSED COCONUT COIR PITH GRANULES AND METHODS FOR THE PRODUCTION AND USE THEREOF

CROSS REFERENCE TO RELATED APPLICATIONS

The present application claims priority to and incorporates by reference in its entirety U.S. Provisional Patent Application No. 61/000,818 entitled "Compressed Coconut Coir Pith Granules and Methods for the Production and Use Thereof" to Marcus Bertin, et al. filed Oct. 29, 2007.

FIELD OF THE DISCLOSURE

The present disclosure relates to compressed coconut coir pith granules for use as growth media and to methods for producing such granules or flakes. More particularly, the compressed granules or flakes produced in accordance with the present invention exhibit enhanced size, density, flowability and abrasion resistance characteristics which render the granules highly desirable for use in seeding mulch, potting mix, garden soil and flower and vegetable furrow covering applications.

BACKGROUND OF THE DISCLOSURE

Coconut coir pith is a by-product of the coconut husk fiber processing industry. Coir is the name given to the fibrous material that constitutes the thick mesocarp (middle layer) of the coconut fruit (*Cocos nucifera*). In processing, the long fibers of coir are extracted from the coconut husk for use in the manufacture of brushes, upholstery stuffing, filters, twine and like products. The short fibers (10 mm or less) and dust (collectively referred to herein as "pith") traditionally have accumulated in large piles or "dumps" as a waste product resulting from the processing of coconut husks to obtain the industrially valuable long fibers.

It has been recognized that coconut coir pith material provides an excellent growing medium for plants and it has been suggested that coconut coir pith can provide an effective alternative to previously standard growing media such as peat moss. Coconut coir pith is very similar to sphagnum peat moss in appearance, having a light to dark brown color and consisting primarily of particles in the size range of 0.2-2.0 min (75-90%). Unlike sphagnum peat, however, there are no sticks or extraneous matter in the coconut coir pith. Furthermore, sphagnum peat moss has a density of about 7 lbs/cu ft when fluffed (30-50% moisture content) whereas coir pith is much denser (i.e., about 43 lbs/cu ft when compressed at a ratio of 5:1 on volume to volume basis and about 12 lbs/cu ft when fluffed and having a 50-55% moisture content).

Coir pith as an amendment has many benefits for all types of soil. It increases the organic matter content and due to its high lignin to cellulose ratio, it remains in the soil significantly longer than peat. It improves water-holding capacity of sandy soils. The drainage of clay soils is improved with its inclusion due to its air porosity and agglomeration with clay particles. However, the use of compressed coir pith bricks is cumbersome for use by consumers. The entire brick must first be expanded with water for a relatively long period of time. Then, the consumer must physically fluff and mix the coir pith for complete wetting and expansion. Only then can the wet, expanded coir pith be spread on and incorporated into the soil.

As employed herein the term "coconut coir pith" is intended to refer to both the coconut husk pith and the short coir fibers which are known to provide an excellent growing medium and to provide a suitable and sustainable substitute for soilless growing media such as peat moss (sphagnum, sedge, hypnum and the like) for growing plants. Coconut coir pith has many physical and horticultural characteristics that make it an ideal growing medium for plants. Coconut coir pith has a high water holding capacity, ideal porosity, high cation exchange capacity and high stability (slow rate of degradation due to high lignin to cellulose ratio which prevents oxidation).

However, coconuts are typically only grown in tropical and sub tropical regions, while demand for the substrate is in the United States and Europe, which entails significant shipping and handling costs.

Presently, the forms in which coconut coir pith is available for import into the United States and Europe are rather limited. Due to the low bulk density of loose coconut coir pith at moisture contents acceptable for shipping, coconut coir pith has been compressed into discs, bricks, or blocks at a compression ratio typically of about 5:1 to enable economical overseas shipping costs. It has been known that compressed coconut coir pith in this form must be mechanically out-turned or exposed to water for a lengthy period to decompress the coconut coir pith before use as such or for inclusion in a consumer product. This processing step is relatively slow and requires the entire disc, brick, or blocks to be out-turned at once. Also, coconut coir pith that is outturned is either dry and dusty or wet and heavy which contributes to further processing problems. Furthermore, coconut coir pith is not commonly baled in the manner of sphagnum peat because this form is less compressed and, therefore, less economical to ship.

Attempts have been made to compress and form coir pith into pellets using pellet mills or extruders as, for example, disclosed in U.S. Published Patent Application 2004/0025422. Those processes require use of high shear compaction methods which generate high levels of heat through friction. Such high temperature processing alters the physical properties of the coconut coir pith substrate. The pellets produced have been found to exhibit undesirable physical characteristics such as relatively slow expansion after compaction, and the coconut coir pith normally does not expand back to its pre-compacted volume after such compaction.

For example, the use of pellet mills or extruders for compaction of coir into small compressed particles has been suggested heretofore. However, pellet making processes use high pressure to extrude the material through small orifices. Unlike roll compaction, pelletizing is a high shear process that produces significant friction and heat in the material. The friction and heat from this process may produce a coir pith pellet with undesirable physical and horticultural properties. Although comparable compression ratios can be achieved, the expansion ratio after the addition of water, water holding capacity of the material, and the rate of expansion of the granules may be reduced.

Accordingly, it is an object of the present disclosure to provide more convenient forms of coconut coir pith for horticultural use which expand rapidly upon contact with moisture.

It is a further object to provide economically effective production methods for producing compacted granular coconut coir pith products which have the desired physical and horticultural properties necessary for final product application, for example, as growth media.

SUMMARY OF THE DISCLOSURE

Compacted granular coconut coir pith products produced in accordance with the disclosure are highly desirable for use in providing growing media in such applications as seeding mulch, potting mix garden soil, flower and vegetable furrow covering applications and the like. More particularly, the present disclosure is generally directed to methods for producing granular coconut coir pith products by subjecting raw coconut coir pith material to roll compaction under specified operating conditions as opposed to the prior art pellet mill compaction or extrusion processes. Roll compaction of the coconut coir pith is followed by subsequent granulation of the compacted granules to provide plant growth media which expand immediately upon exposure to moisture or water.

The compressed granular coconut coir pith products produced in accordance with the present disclosure may be composed of coconut coir pith only or may contain other horticulturally acceptable media such as fertilizers, micronutrients, pH adjusting agents, wetting agents, biostimulents, microbes and other bioactive materials. The granules produced in accordance with this invention have a bulk density in a range of between about 240 kg/m$^3$ and 600 kg/m$^3$ and expand rapidly when exposed to moisture.

The disclosure provides a method for preparing compressed coir granules that expand readily with exposure to water. The granules are formed by roll compaction and subsequent granulation (milling and screening). This process has been shown to produce compacted coir granules with superior characteristics to coir pellets that are manufactured with a pellet mill or extruder.

DETAILED DESCRIPTION OF EXEMPLARY EMBODIMENTS

Figure 1:
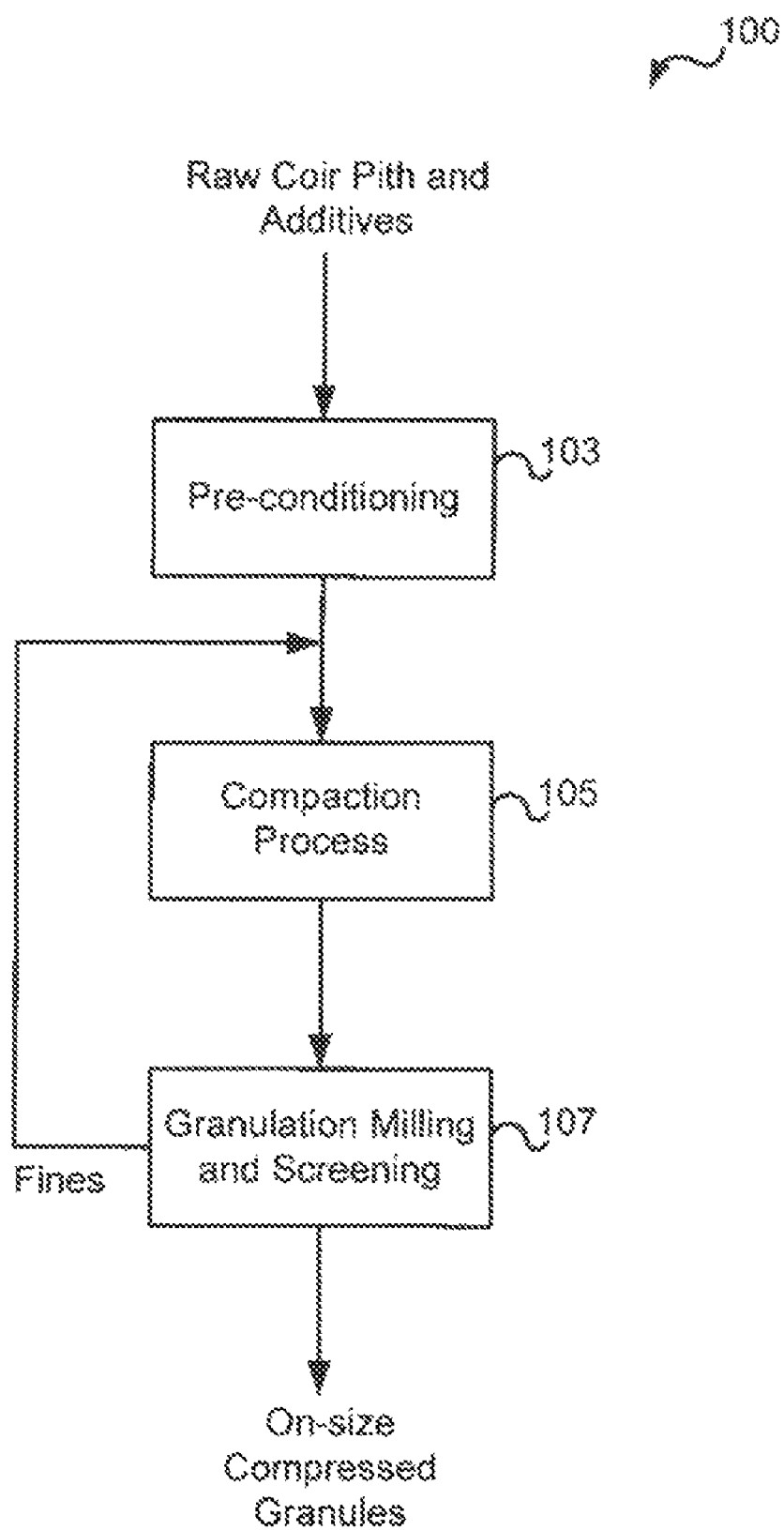
FIG. 1 is a flow diagram illustrating the processing steps in accordance with the methods of the present disclosure for producing compressed coconut coir pith granules.

Coconut coir pith has a unique microstructure composed of a relatively uniform pore structure. With application of high pressure, the pore structure can be compressed and the resulting compressed coconut coir pith product will expand back to its original volume upon exposure to moisture. However, we have found that it is critical to employ certain operating conditions to achieve compression of the coconut coir pith substrate to avoid excessive heat generation through friction that could denature the desired physical and horticultural characteristics of the material.

The compressed granules (including flakes, particles, pellets and the like) produced in accordance with this invention are formed from a variety of coconut coir pith substrate materials. It should be noted that as employed herein the term "granules" is intended to include of all granular forms and shapes including flakes, particles, pellets and the like. Typically, the substrate materials employed herein comprise mixtures of coir fiber and coir pith (with pith being the more desirable component of the mixture). However, the substrates may comprise other mixtures such as coconut coir pith and up to about 50% (by weight) of a horticulturally acceptable organic or non-organic media such as sphagnum peat, humus peat, sedge peat, bark fines, rice hulls and mixtures thereof or, in addition, any other material familiar to those skilled in horticulture.

The compressed granules formed in accordance with the present disclosure, may be randomly shaped and angular in surface appearance and may contain pieces of coir fiber. The compressed flakes may contain additives such as fertilizers, micronutrients, pH adjusting agents such as lime, and/or various wetting agents including horticulturally acceptable surfactants and other additives designed to enhance or protect the germination, development, and/or growth of seeds and plants implanted in a growth media formed from the compressed products. The additives also may be used to improve the physical and horticultural characteristics of the granules. The additives alternatively may comprise pesticides or herbicides.

Typically, the concentration of the additives in the compressed products should not exceed about 10% of the total weight of the product, but could comprise up to about 50% (by weight) of the flake.

In a preferred embodiment, the compressed coconut coir pith granules are formed by roll compaction and subsequent granulation as described in further detail below. Preconditioning of the coconut coir pith is an optional step with the major purpose of reducing the length of the coir fibers present in the coir pith whereby efficiency of compaction and subsequent granulation is increased. Most preferably, the coir pith contains less than about 10% by weight of coir fiber, but could contain up to about 50% by weight of coir fiber.

The compressed flakes formed by employing the methods of the present invention are useful for various horticultural applications when they are sized greater than about 32 mesh (US sieve size) and pass through about a 1½ inch screen. The particle size distribution may be adjusted within this range to accommodate specific product application requirements by changing the process conditions of the post-compaction granulation milling and screening loop.

The moisture content of loose coir pith in the coconut coir pith substrate may be less than about 25% water by weight for compaction of the substrate. Preferably, the range of moisture content should be between about 8 and about 15% water (by weight). The compaction itself may not significantly affect the moisture content of the coir pith; however, if desired, steps can be taken to adjust the moisture content during any preconditioning and/or blending stages prior to compaction.

Depending on the intended application of the compressed coconut coir pith produced by employing the methods of the present disclosure, the granules produced thereby should have sufficient physical integrity and abrasion or attrition resistance to satisfy the requirements of the intended use.

In order to quantify the abrasion or attrition resistance of compressed granules and the ability of the compressed granular products to withstand mechanical processing the following procedure may be employed wherein a limit screen size that retains 90% of a granular material is determined by particle size analysis prior to testing. Then, granular test samples are placed on the limit screen with stainless steel balls of a specific size. The screen may be placed in a RoTap®-style Sieve Shaker for a specified amount of time. The abrasion resistance may be expressed as a percent of material remaining on the limit screen. The abrasion resistance should be sufficient to maintain integrity throughout additional processing, typically blending with other components, and final consumer or professional packaging.

A distinction of the compressed coir pith granules produced by employing the methods of the present invention as compared with extrusion of compressed coir pith disks, bricks, and blocks, is that the extrusion method products are slow to expand when exposed to moisture whereas the roll compacted compressed granules (including flakes, particles, pellets and the like) produced in accordance with the present disclosure have been found to expand within seconds of exposure to moisture.

For example, a compressed single granule of this invention which is dropped in sufficient water to expand it fully may typically be substantially completely expanded within about 15 seconds. This quick expansion can be attributed to the method of compaction and the high surface to volume ratio of the products produced. Specifically, granules of less than 1/4" in diameter may be completely expanded within less than about 10 seconds while larger granules may require longer periods to fully expand than the smaller granules or flakes. The expanded granules may de-granulate or fall apart into smaller pieces readily after being submerged in water.

Bulk compressed granules of the present disclosure may have an apparent expansion ratio when exposed to moisture of between about 2:1 and about 5:1, with expansion ratios of about 3.5:1 and about 4:1 being typical for compressed granules containing 100% coir pith. Expansion ratios are measured by taking a known volume of compressed coir pith granules and mixing by hand while adding the minimum amount of water to expand the coir pith until no palpable granules remain. The volume of the expanded material is then compared to the original compressed material. Inclusion of high percentages of other growing media such as sphagnum peat or bark fines in the granular composition may result in lower expansion ratios.

The expanded coir particles formed from the compressed granules of this invention may have a high water holding capacity of up to about 8 times their weight. The compressed granules produced may have a bulk density that ranges from about 240 kg/m$^3$ to about 600 kg/m$^3$.

In accordance with the present disclosure, the compressed coir pith granules can, for example, be blended with grass or other seeds or plant propagules and optionally nutrients and other commonly known horticulturally acceptable ingredients to produce a seeding mulch or a bare spot repair product for use in treating lawns and other areas requiring soil amendment or plant establishment. Fertilizer, pH adjustment agents such as lime, micronutrients, wetting agents (horticulturally acceptable surfactants), and other plant or biological growth enhancers may be included in the granules or the product mix. The resulting product mix may be a physical blend of compressed coir pith granules, seed or other plant propagules, and other additives (fertilizer, micronutrients, lime for pH adjustment, and other horticulturally acceptable ingredients). In addition, granules of acceptable size may be matched with other horticultural, agricultural, or garden seeds or plant propagules to enhance germination and establishment of lawns, gardens or other areas to be amended or vegetated.

The granules can range in size from less than about 1½" to greater than about 32 mesh. The size of the granules can be adjusted based on application. For example, inclusion of the granules as mulch in a combination grass seed, fertilizer, and mulch product, the granule sizes would preferably be in the range of about less than about 4 mesh and to greater than about 18 mesh which would be relatively similar to the size of the seeds. The free flowing nature of the granules allows the user to sprinkle the product on a bare spot in a lawn with minimal effort. Once water contacts the granules either through overhead irrigation, rain, or moisture in the soil, the compressed granules expand and may help protect the seed from desiccation. Due to its high moisture holding capacity, the expanded coir pith may function as seed mulch that holds moisture near the seeds necessary for germination, early establishment, and healthy growth.

The coir pith's high water holding capacity may also help trap moisture in the root zone of the seedling by reducing evaporation from the soil. The nutrients in the product mix may be released directly into the soil and are less likely be adsorbed or tied up in the mulch layer. These unique properties enable the germinating grass to establish its roots directly in the soil and less so into the mulch, increasing the survival rate of seedlings introduced therein as compared to other known products. Results with trials using the products of the present invention have shown strong improvements over bare seed and currently available seeding mulches.

Coir pith in its raw form may not contain all the necessary nutrients for healthy plant growth. By including fertilizers and appropriate nutrients in the compaction process herein, a suitable potting mix may be made. The fertilizer chosen could be a slow release type fertilizer to provide plant nutrition for an extended period of time. Additions (fertilizers, lime for pH control, micronutrients, surfactants and biologically active ingredients) made prior to compaction of the coconut coir pith may result in production of homogeneous granules. The granules could range in size from less than about 1½" to greater than about 18 mesh (US Sieve Series), however they would preferably be less than about ½" to greater than about 6 mesh. The resulting products may have improved water-holding capacity over existing potting soils based on the natural properties of coir pith. Due to the high water-holding capacity, favorable air porosity, and correct nutrient additions, this product could result in improved results for consumers over ordinary potting soil. The compressed potting soil may be free flowing and may be easily poured from the package into a pot or container. When watered, the potting soil may rapidly expand to fill the container.

By using coir pith in the form of compressed granules produced in accordance with the methods of the present disclosure, the consumer would need to simply incorporate the granules into the soil. When the granules contact water, either through irrigation, rain, or available soil moisture, they may expand and improve the soil structure, water holding capacity, cation exchange capacity and other soil properties, such as tilth, depending on the nature of the soil being amended. The granules could range in size from less than about 1½" to greater than about 18 mesh, preferably, less than about ¾" to greater than about 6 mesh.

Additionally, the products of the present invention may be used as garden amendments such as for several vegetable species (radish, carrot, lettuce, etc.) which lend themselves to planting in a row or furrow followed by coverage of the seed with soil. Seedlings may be thinned over time. In this regard, it should be noted that by mixing the seed with an appropriate coir granule size fraction that matches the vegetable seed size, the seed and expandable soil mix can be effectively poured into the furrow or even onto the soil surface. Watering would then expand the coir and as a result the seed would be buried under a protective mulch cover that facilitates germination. Similar results could be obtained with flower seed.

Thus, it should be noted that the compressed coir pith granules of the present disclosure can be used more effectively and efficiently than previously known products in a variety of commercially and horticulturally significant applications including, for example, expandable potting mixes; garden soil amendments and flower and/or vegetable furrow coverings and the like.

A process in accordance with the present invention is provided in the flow diagram 100 shown in FIG. 1. It should be noted that the preconditioning step 103 illustrated in the flow diagram is optional but may increase the efficiency of converting the compacted substrate into granules. In this preconditioning step 103, loose coir pith may be treated using an air swept mill (such as a "Pulvicron" manufactured by Bepex, Minneapolis, Minn. or other similar mills known to those skilled in the art) to reduce the length of any fibers. The raw material to be preconditioned may be conveyed through the mill by an air stream; therefore, the moisture content of the coir can be reduced by controlling the humidity and temperature of the air stream.

The preconditioned coir pith which may be blended with additive materials may then be subjected to compaction into a large ribbon by means of a roll compactor, shown in step 105. The roll compactor applies pressure to the material in the range of about 1500 to about 2500 psi, preferably, about 1800 psi to about 2200 psi. The roll compactor may form the material into a semi-continuous ribbon or sheet. The compacted ribbon may be broken into granules or flakes, typically less than about 2" in diameter with a mixture of smaller pieces, by a flake-breaker or other means to improve the ability to convey the material to the milling and screening loop. Then, the granules or flakes may be fed through a conventional milling and screening loop, shown in step 107, for granulation to a desired size range.

Once in the milling and screening loop, shown in step 107, the screen may separate the pieces into three streams: oversized pieces, on-size granules, and undersized fines. The oversized material may be recycled in the milling and screening loop, step 107, until it is reduced in size, and the fines are returned to the feed of the compactor of step 105. The desired size distribution of the compressed granules can be controlled by process changes in the milling and screening loop. The compressed granules preferably have a bulk density of between about 400 kg/m$^3$ and 500 kg/m$^3$, but could be anywhere in the range of 240 kg/m$^3$ and 600 kg/m$^3$, but more ideally in the range of 300 kg/m$^3$ and 500 kg/m$^3$. When exposed to water, the granules may quickly expand to about 3 to 4 times their compressed volume.

The density of the granules produced in accordance with the methods of the present disclosure and their free flowing physical properties may enable optimization of the filling of shipping containers resulting in economic savings compared to compressed disks, bricks and blocks. Furthermore, such compressed disks, bricks and blocks are typically stacked on pallets for shipment in cargo containers whereas the compressed granular products produced in accordance with the present invention can be bulk filled into containers to be dumped on arrival at their destination resulting in considerable cost and efficiency savings such as the cost of pallets.

Example 1

Coir pith bricks of Sri Lankan origin were obtained from Haymark (Spring, Tex.). The bricks were out turned using a pin mill and screened through 3/8" screen. The loose coir had a moisture content of between 10 and 17% by weight. A horticulturally acceptable surfactant was obtained from BASF, Pluronic L-62 is the name of the proprietary non-ionic surfactant. The coir was blended with 1% by weigh solution of a 1:1 mixture of surfactant and water. The surfactant treated coir was then fed into a Chilsonator Model 1.5L×8D Roll Compactor manufactured by Fitzpatrick Co. The roll pressure (oil pressure) was operated at between 1200 and 1800 psi. The feed screw was turning at 70 rpms. The coir left the compactor as a mixture of fines and semi-continuous ribbons. The compacts were collected and screened using a Sweco vibratory screener to +1/4". The fines were recycled back to the compactor. After about 20 lbs of compacts larger than 1/4" were collected, the material was milled in a Fitzmill (Fitzpatrick Co.) with knives installed and a 1/4" perforated plate for classification. After milling the granules were screened to −1/4", +30 mesh. A sample of the granules was then expanded by adding water and mixing by hand until no palpable granules remained. The expansion volume ratio was measured to be 3.25:1 versus the original compressed granules.

Example 2

Coir pith bricks of Sri Lankan origin were obtained from Haymark (Spring, Tex.). The coir bricks were outturned using an Extructor Model RE-12 manufactured by Bepex (Minneapolis, Minn.). The coir was then milled using a Pulvicron, PC-20 (Bepex) in order to reduce the length of fibers present with the pith. The pulvicron is an air-swept mill with and internal classifier. Use of this mill is effective at reducing the fiber length and adjusting the moisture content of the coir pith by controlling the temperature and/or humidity of the air stream. Moisture content of the coir pith was typically between 10% and 15% by weight after milling. The pith was then batch blended in a ribbon blender with pulverized dolomite lime to adjust pH and 15-15-15 fertilizer (containing ammonium nitrate, ammonium sulfate, diammonium phosphate, and potassium chloride). The blended coir was compacted into ribbons using a Model MS-75 Compactor (Bepex) with a medium compression feed screw and flat (smooth surfaced) rolls. The roll pressure was set at 2300 psi and 6 rpm, and the feed screw was running at 35 rpm. The result was a semi-continuous ribbon of compressed coir pith. The ribbon was fed into a Jacobsen Crusher (Carter Day, Minneapolis, Minn.) with a 1" square grate which reduced the ribbon into smaller pieces to enable conveying via screw conveyors and bucket elevators. The compacted coir pieces were then conveyed to a milling and screening loop consisting of a 60" Sweco Screener and a Bepex Disintegrator RD-8 as a granulation mill. The screener separated the compacted coir into three streams; oversized pieces, on-size granules, and fines. The oversized pieces were sent to the granulation mill and subsequently returned to the screen. The fines were returned to the compactor, and the on size material was collected. In this example the on-size material was −6 mesh, +12 mesh with a loose bulk density of 370 kg/m$^3$ (23 lbs/ft$^3$). The expansion ratio of the compacted material after wetting and fluffing by hand was 3.75:1.

Typical ranges of process conditions for the compaction and granulation for the equipment in Example 2 are listed below. The ranges listed below are not the only conditions under which compressed coir pith granules with useful properties can be produced, and are exemplary only.

| Description of Process Condition | Range |
| --- | --- |
| Pulvocron Mill RPM | 2500 to 5500 |
| Pulvocron Classifier RPM | 0 to 1830 |
| Compactor Feed Screw RPM | 17 to 100 |
| Compactor Roll RPM | 5 to 15 |
| Roll Pressure PSI | 1600 to 2400 |
| Screen Size | −1 1/2" to +12 mesh |

The table below provides a comparison of expansion ratios and expansion times for coir pith pellets formed from a pellet mill, and coir granules formed from a roll compactor:

Example of Expansion Results

| Description | Production Method | Expansion ratio | Time allowed for expansion | water holding (g H₂O/ g coir) | Physical result of expansion |
|---|---|---|---|---|---|
| ⅜" Coir pellets | California Pellet Mill | 1.75:1 | 10 minutes | 2 | still contains palpable pieces |
| −5/16", +6 mesh Coir Granules | Roll compactor | 3.5:1 | <1 minute | 8.5 | fully expanded |

Although the invention has been described in its preferred forms with a certain degree of particularity, it is to be understood that the present disclosure has been made by way of example only. Numerous changes in the details of the compositions and ingredients therein as well as the methods of preparation and use will be apparent without departing from the spirit and scope of the disclosure, as defined in the appended claims.

We claim:

1. A composition produced by a method comprising:
   a. subjecting a substrate material consisting of coconut coir pith to roll compaction; and
   b. granulating the roll compacted material to form a granulated composition;
   wherein the granulated composition retains a final moisture content of about 8% to about 17%.

2. The composition of claim 1, wherein the coconut coir pith substrate material comprises a mixture of coir pith and coir fiber.

3. The composition of claim 1, wherein the granulated composition is randomly shaped and angular in surface appearance.

4. The composition of claim 1, wherein the granulated composition is sized greater than about 32 mesh (US sieve size) and passes through about a 1½ inch screen.

5. The composition of claim 1, wherein the granulated composition has enhanced physical integrity and abrasion resistance.

6. The composition of claim 1, wherein the granulated composition completely expands within about 15 seconds after exposure to moisture.

7. The composition of claim 6, wherein the granulated composition has an apparent expansion ratio of between about 2:1 and about 5:1 when exposed to moisture.

8. The composition of claim 6, wherein the granulated composition has a water holding capacity of 6 times its weight.

9. The composition of claim 1, wherein the granulated composition is free flowing and have a bulk density in a range of from about 200 kg/m³ to about 600 kg/m³.

10. The composition of claim 1, wherein the substrate material is subjected to compaction in a roll compactor at a pressure in the range of about 1500 to about 2500 psi.

11. The composition of claim 1, wherein the method further comprises
   d. recycling oversized or undersized granulated compositions.

12. The composition of claim 1, wherein the substrate material is subject to a preconditioning step of reducing the length of coir fibers before said roll compaction.

13. A composition produced by a method comprising:
   a. subjecting a substrate material consisting of coconut coir pith to roll compaction; and
   b. granulating the roll compacted material to form a granulated composition;
   wherein the granulated composition completely expands within about 15 seconds after exposure to moisture.

14. The composition of claim 13, wherein the substrate material comprises a mixture of coir pith and coir fiber.

15. The composition of claim 13, wherein the granulated composition is randomly shaped and angular in surface appearance.

16. The composition of claim 13, wherein the granulated composition is sized greater than about 32 mesh (US sieve size) and passes through about a 1½ inch screen.

17. The composition of claim 13, wherein the granulated composition has enhanced physical integrity and abrasion resistance.

18. The composition of claim 13, wherein the method further comprises
   d. recycling oversized or undersized granulated compositions.

19. The composition of claim 18, wherein the granulated composition has an apparent expansion ratio of between about 2:1 and about 5:1 when exposed to moisture.

20. The composition of claim 18, wherein granulated composition has a water holding capacity of 6 times its weight.

21. The composition of claim 13, wherein the granulated composition is free flowing and have a bulk density in a range of from about 200 kg/m³ to about 600 kg/m³.

22. The composition of claim 13, wherein the granulated composition is subjected to compaction in a roll compactor at a pressure in the range of about 1500 to about 2500 psi.

23. The composition of claim 13, wherein the substrate material is subject to a preconditioning step of reducing the length of coir fibers before said roll compaction.

24. A method for preparing compressed coconut coir pith granules comprising:
   a. subjecting a substrate material consisting of coconut coir pith to roll compaction; and
   b. granulating the roll compacted material to form the granulated compositions;
   wherein the composition retains a final moisture content of about 8% to about 17%.

25. The method of claim 24, wherein the substrate material comprises a mixture of coir pith and coir fiber.

26. The method of claim 24, wherein the granulated compositions is randomly shaped and angular in surface appearance.

27. The method of claim 24, wherein the granulated compositions is sized greater than about 32 mesh (US sieve size) and passes through about a 1½ inch screen.

28. The method of claim 24, wherein the granulated compositions has enhanced physical integrity and abrasion resistance.

29. The method of claim 24, wherein the granulated compositions completely expand within about 15 seconds after exposure to moisture.

30. The method of claim 29, wherein the granulated compositions have an apparent expansion ratio of between about 2:1 and about 5:1 when exposed to moisture.

31. The method of claim 29, wherein the granulated compositions have a water holding capacity of 6 times its weight.

32. The method of claim 24, wherein the granulated compositions is free flowing and have a bulk density in a range of from about 200 kg/m³ to about 600 kg/m³.

33. The method of claim 24, wherein the granulated compositions is subjected to compaction in a roll compactor at a pressure in the range of about 1500 to about 2500 psi.

34. The method of claim 24, further comprises
   d. recycling oversized or undersized granulated compositions.

35. The method of claim 24, wherein the substrate material is subject to a preconditioning step of reducing the length of coir fibers before said roll compaction.

36. A compressed and granulated composition comprising a substrate material consisting of 100% coir pith; wherein the final moisture content of said composition is about 8% to about 17%; and further wherein the composition is capable of completely expanding in 15 seconds upon contact with water.

37. A method of providing a garden amendment or lawn bare spot repair, said method comprising the steps of:
   a. incorporating into soil, pouring onto a soil surface, or sprinkling on a lawn bare spot a composition produced by a method comprising (i) subjecting a substrate material consisting of coconut coir pith to roll compaction; and (ii) granulating the roll compacted material to form a granulated composition, wherein the composition retains a final moisture content of about 8% to about 17%;
   b. adding water to the composition; and
   c. completely expanding the composition within 15 seconds of adding said water.

38. A method of providing a garden amendment or lawn bare spot repair, said method comprising the steps of:
   a. incorporating into soil, pouring onto a soil surface, or sprinkling on a lawn bare spot the composition of claim 36;
   b. adding water to the composition; and
   c. completely expanding the composition within 15 seconds of adding said water.

39. A compressed and granulated composition comprising a substrate material consisting of 100% coir pith; wherein the final moisture content of said composition is about 8% to about 17%.

40. A compressed and granulated composition comprising a substrate material consisting of 100% coir pith; wherein the composition is capable of completely expanding in 15 seconds upon contact with water.

* * * * *